United States Patent [19]

Engel et al.

[11] Patent Number: 4,544,769

[45] Date of Patent: Oct. 1, 1985

[54] PROCESS FOR THE PREPARATION OF COMPACT NITROGUANIDINE

[75] Inventors: Walter Engel, Pfinztal-Berghausen; Herbert Heinisch, Ettlingen, both of Fed. Rep. of Germany

[73] Assignee: Fraunhofer-Gesellschaft zur Forderung der angewandten Forschung e.V., Munich, Fed. Rep. of Germany

[21] Appl. No.: 184,912

[22] Filed: Sep. 8, 1980

Related U.S. Application Data

[63] Continuation of Ser. No. 970,140, Dec. 18, 1978, abandoned.

[30] Foreign Application Priority Data

Dec. 17, 1977 [DE] Fed. Rep. of Germany ....... 2756335

[51] Int. Cl.$^4$ ............................................ C07C 129/12
[52] U.S. Cl. .................................................... 564/242
[58] Field of Search ......................................... 564/242

[56] References Cited

U.S. PATENT DOCUMENTS 2,946,820  7/1960  Henry et al. .

FOREIGN PATENT DOCUMENTS 1048528  2/1956  Fed. Rep. of Germany .

OTHER PUBLICATIONS

Cave, G. Allen et al., *Ind. & Eng. Chemistry*, vol. 41, (1949), pp. 1286-1290.
Pritchard, E. J. et al. *Chemical Abstracts*, vol. 42 (1948) #369c.
Hino, Kumao et al., *Chemical Abstracts*, vol. 56 (1962) #2338.
Hatler, L. E., Los Alamos Informal Report LA-523-5-MS.
McGraw-Hill *Encyclopedia of Science and Technology*, vol. 13 (1971), p. 323.
Pritchard, E. J. et al., Can J. Research (1947), vol. 25, Sec. F, pp. 257-263.

*Primary Examiner*—Natalie Trousof
*Assistant Examiner*—L. Hendriksen
*Attorney, Agent, or Firm*—Antonelli, Terry & Wands

[57] ABSTRACT

A method of preparing compact nitroguanidine of high bulk density by crystallization from an initially hot nitroguanidine solution. The solution is cooled, while being agitated, at a temperature gradient of at least 3° C./minute, with the crystallization taking place, only at temperatures less than 50° C., from a supersaturated solution. The solvent for the nitroguanidine solution is selected from the group consisting of polyhydric, lower aliphatic alcohols, the mono- or dialkyl ethers of these polyhydric, lower aliphatic alcohols, dimethylformamide, dimethyl sulfoxide, or mixtures thereof. The formed nitroguanidine, in addition to having a high bulk density, has a compact form which makes it possible to prepare a slurry from nitroguanidine and to be able to process nitroguanidine as a composition amenable to casting.

26 Claims, No Drawings

PROCESS FOR THE PREPARATION OF COMPACT NITROGUANIDINE

This is a continuation of application Ser. No. 970,140, filed Dec. 18, 1978, now abandoned.

The invention relates to a process for the preparation of compact nitroguanidine of a high bulk density from a hot nitroguanidine solution by cooling and agitation of the solution.

Nitroguanidine is utilized as a propellant and explosive, the detonating velocity of which is higher than that of TNT [trinitrotoluene] and which offers certain advantages over conventional explosives due to its great shock insensitivity and its higher inherent density. However, on the other hand, nitroguanidine has the disadvantage that it is crystallized from an aqueous solution in long needles having a bulk density of 200 to 300 g./l. These crystal needles must be mechanically comminuted to make further processing possible. However, in such a comminuting step, only the length of the needles is shortened, without thereby attaining any appreciable increase in bulk density. Finally, the grinding of an explosive substance, such as nitroguanidine, is not without risks.

Therefore, numerous attempts have been made to avoid the comminuting process by a corresponding control of the crystallizing process, for example by crystallizing nitroguanidine in a finely distributed form (U.S. Pat. Nos. 2,318,577; 2,395,856; 2,445,478) or with a large surface area (German Pat. Nos. 1,010,880; 1,142,860; French Pat. No. 1,116,300). Other processes aim toward increasing the bulk density by varying the surface configuration. Thus, it is known to add to the aqueous nitroguanidine solution substances, such as, for example, the nitroguanyl hydrazone of benzaldehyde (U.S. Pat. No. 2,946,820; British Pat. No. 1,196,731), polyvinyl alcohol (German Pat. No. 1,048,528), or mannan (Japanese Pat. No. 16,467). These additives all act toward producing compact crystals, reaching in this way bulk densities of between 600–900 g./l.

It is furthermore known to pour a hot, aqueous solution of nitroguanidine having a temperature of around 100° C. into another solvent (i.e., diluent) which is water-miscible, but possesses no solubility, or only a very low solubility, for nitroguanidine. In this process, the second solvent is initially at about room temperature, and the mixture is subsequently subjected to gradual cooling. Suggestions for the second solvent are methanol, ethanol, and acetone (Canadian Journal of Research, July 1947, No. 4, pages 257–263). With this conventional process, larger crystals are obtained than in other conventional processes and—under maximally favorable experimental conditions—a maximum bulk density is produced of 960 g./l. In a modification of this procedure, it is known (Industrial and Engineering Chemistry, 41: 1286–1290 [1949] to start, instead of with an aqueous solution, with a solution of monohydric alcohols, e.g. isopropanol or n-butanol. The results are essentially the same, the product being exclusively needle-shaped crystals. In this connection, a saturated, boiling solution of nitroguanidine in methanol, ethanol, or n-butanol is likewise described, which is cooled directly, i.e., without introduction into a second solvent. However, this process yielded less advantageous results than the step of cooling a saturated, aqueous solution.

The invention is based on the object of further developing the process set forth hereinabove in such a way that, in addition to higher bulk densities, a compact form and thus satisfactory flow properties can be attained, making it possible in particular to prepare a slurry from nitroguanidine and to be able to process nitroguanidine as a composition amenable to casting.

This object has been attained according to this invention by utilizing as the solvent polyhydric, lower aliphatic alcohols ($C_1$ to $C_4$), the mono- and dialkyl ethers thereof, dimethylformamide, dimethyl sulfoxide, or mixtures thereof, and by cooling the solution with a temperature gradient of more than 3° C./minute, where the solvent or solvents, the starting temperature of the solution, and the coolant temperature are selected so that the supersaturation of the solution attained during cooling leads to crystal formation only at temperatures of below 50° C. Examples of the used solvents, besides DMF and DMSO, are: ethyleneglycol, di-ethylene glycol, their mono-methyl-, ethyl-, isopropyl- and butyl-ethers, propane diole, butane diole and glycerine.

Practical experiments have shown that with the use of the aforementioned solvents and maintaining and/or adjusting the thermal parameters correspondingly, globular nitroguanidine can be obtained in good yields. The thus-produced particles are polycrystalline. Crystallization must take place from a strongly supersaturated solution, so that an onset of the crystallization process already at higher temperatures should be avoided. Furthermore, it is advantageous to keep the temperature gradient as high as possible during the cooling step. For example, a preferred temperature gradient is about 7° C./minute.

Although dimethylformamide had been described as a solvent for nitroguanidine (Hatler, L. E. in Los Alamos Informal Report LA-5235-MS, editor: U.S. Department of Commerce, Springfield, Va.), this still did not result in globular particles, but rather yielded irregular piles of crystals, because apparently the experimental conditions in accordance with the present invention had not been recognized. In the disclosed process, in order to improve the crystal configuration, the addition of a polyamide resin has been proposed, the purpose being the formation of block-shaped single crystals. The present invention, without such additives, achieves more favorable results.

The process of this invention can also be conducted in combination with the aforedescribed, conventional recrystallizing process, by pouring the hot nitroguanidine solution into a second cold solvent, at a temperature of, for example, 0° C., miscible with the first solvent but showing no or (i.e., diluent) only poor solubility with respect to nitroguanidine, and then cooling the mixture further. Here, too, globular, polycrystalline particles of high bulk density are formed if the above-mentioned thermal conditions are maintained. The diluent can—as in the prior art—consist of a lower aliphatic alcohol or acetone, but also of tetrahydrofuran, dioxane, chloroform, carbon tetrachloride, or benzene and/or a mixture of these compounds.

The hot nitroguanidine solution can optionally contain water, xylene, or the like as an additional solvent. The hot nitroguanidine solution can be a saturated solution. The initial temperature of the nitroguanidine solution is preferably between 80° and 150° C. while the cooling step is conducted preferably at a coolant temperature of about 0° C. If a diluent is used at a temperature of 0° C., then the temperature rises to between 30° and 50° C. when the hot nitroguanidine solution is introduced. Therefore, it has proven to be advantageous to cool the mixture of nitroguanidine solution and the diluent continuously at about 0° C.

The mother liquor remaining after separation of the particles can, in a continuous process, be recycled and readjusted to the saturation degree by adding solvent and nitroguanidine.

The following description represents several practical examples, wherein the starting point in all cases is a saturated solution.

EXAMPLE 1

10. g. of nitroguanidine is dissolved in 400 g. of glycerin at a temperature of 110° C. and cooled in an ice bath under agitation. The first crystals appeared at 20° C. After an agitating period of 2 hours for completion of crystallization, a globular product is obtained which is vacuum-filtered, washed with acetone, and dried.
Yield: 9.4 g.
Bulk density: 990 g./l.

In this and in all following examples the temperature of 0°C. degrees was reached within 10 to 15 minutes.

EXAMPLE 2

20 g. of nitroguanidine is dissolved in 400 g. of ethylene glycol at about 95° C. and cooled in an ice bath under agitation. The first crystals appeared at 50° C. After one hour of agitation, a globular product is obtained. After vacuum-filtering, washing in acetone, and drying, the following data are obtained:
Yield: 16 g.
Bulk density: 1020 g./l.

EXAMPLE 3

20 g. of nitroguanidine is dissolved in 400 g. of diethylene glycol at 100° C. and cooled in an ice bath under agitation. The first crystals appeared at 30°. After one hour of agitation, a globular product is obtained. After vacuum-filtering, washing in acetone, and drying, the following values are obtained:
Yield: 11.0 g.
Bulk density: 1000 g./l.

EXAMPLE 4

14 g. of nitroguanidine is dissolved in 400 g. of ethylene glycol monoethyl ether at 130° C. and cooled in an ice bath under agitation. The first crystals appeared at 45°. After an agitating period of 1 hour, globular nitroguanidine is precipitated. After vacuum-filtering, washing in acetone, and drying, the following data evolve:
Yield: 7.9 g.
Bulk desnity: 950 g./l.

EXAMPLE 5

32 g. of nitroguanidine is dissolved in 400 g. of diethylene glycol monomethyl ether at 150° C. and cooled in an ice bath under agitation. The first crystals appeared at 0°C. after 2 hour of agitation. After 4 hours of agitation, the globular product precipitate is vacuum-filtered, washed in acetone, and dried. The following values are determined:
Yield: 71.5 g.
Bulk density: 960 g./l.

EXAMPLE 6

100 g. of nitroguanidine is dissolved in 400 g. of dimethylformamide at 85° C. The first crystals appeared after 10 minutes of agitation at 0°C. and cooled in an ice bath under agitation. After 2 hours of agitation in the ice bath, a globular product is obtained which has the following values after the globular product has been vacuum-filtered, washed in acetone, and dried:
Yield: 34 g.
Bulk density: 980 g./l.

EXAMPLE 7

60 g. of nitroguanidine is dissolved in a mixture of respectively 200 g. of dimethylformamide and diethylene glycol monomethyl ether at 110° C. The first crystals appeared at 40° C. After one hour of agitation in an ice bath, the globular product precipitate is vacuum-filtered, washed with acetone, and dried. The following values are obtained:
Yield: 39.3 g.
Bulk density: 910 g./l.

EXAMPLE 8

35 g. of nitroguanidine is dissolved in a mixture of respectively 200 g. of dimethylformamide and xylene at 120° C. The first crystals appeared at 35° C. After 1 hour of stirring in an ice bath, globular nitroguanidine is precipitated. After vacuum-filtering, washing with acetone, and drying, the following data are determined:
Yield: 16.5 g.
Bulk density: 990 g./l.

EXAMPLE 9

40 g. of nitroguanidine is dissolved in a mixture of 0.25 l. of glycerin and 0.25 l. of water at about 95° C. and poured, under agitation, into 1 l. of 2-propanol having a temperature of 0° C. Crystallization starts immediately. The temperature rises to about 44° C. during this step. By further stirring in an ice bath, the mixture is cooled to 0° C. After 1 hour of agitation, the thus-precipitated nitroguanidine is vacuum-filtered, washed with 2-propanol, and dried at 70°–80° C. The nitroguanidine has a globular shape.
Yield: 30.7 g. corresponding to 76.75%
Bulk density: 940 g./l.

EXAMPLE 10

At 110°–110° C., 50 g. of nitroguanidine is dissolved in 0.5 l. of ethylene glycol and poured, under agitation, into 1.5 l. of acetone of 0° C. The temperature rises during this step to about 36° C. By further agitation in an ice bath, the mixture is cooled to 0° C. After one hour of agitation in the ice bath, the thus-precipitated nitroguanidine is vacuum-filtered, washed with acetone, and dried at 70°–80° C. The precipitated nitroguanidine has a globular shape.
Yield: 42 g. corresponding to 84%
Bulk density: 1020 g./l.

Crystallization from the strongly supersaturated solution and the temperature at which the crystallization takes place can optionally be controlled during the cooling process by the addition of nucleators. The nucleators also make it possible to shift the particle size toward smaller values between 40 and 100 microns average particle size. Primarily suitable for this purpose are insoluble substances having a small particle size, e.g., $SiO_2$, $TiO_2$, $CuO$, $PbO$, but also fine-grained nitroguanidine of 3 to 4 microns. Finally, it is also possible to employ another explosive, e.g RDX or M or X, the particles of which then form the nucleus of the polycrystalline nitroguanidine grain.

It is to be noted furthermore that in all aforementioned examples the agitator should have a speed of between 100 and 300 r.p.m. Also, the temperature of the ice bath in each of the foregoing examples was 0° C.

If the crystallization begins at too high a temperature (>50° C.), then the bulk density is generally poor, which is an indication for the fact that the starting concentration is too high. By reducing the starting temperature of the saturated solution, the starting concentration of the solution can be varied, so that the optimum conditions can be readily determined under adaptation to the respective solvent.

We claim:

1. Process for the preparation of nitroguanidine having a high bulk density and a globular form from a hot saturated solution of nitroguanidine in a solvent, said hot saturated solution being at a starting temperatue of 80° C.–150° C., comprising cooling the hot saturated solution of nitroguanidine in a solvent from said starting temperature while being agitated, whereby nitroguanidine, having a high bulk density and a globular form, is crystallized from a strong supersaturation of the solution, wherein the solvent is selected from the group consisting of polyhydric lower aliphatic alcohols, mono- or dialkyl ethers of the polyhydric lower aliphatic alcohols, dimethylformamide, dimethyl sulfoxide, or mixtures thereof, the solution is cooled at a temperature gradient of more than 3° C./minute, and the solvent, the starting temperature, and the coolant temperature are selected such that crystallization of the nitroguanidine from the solution occurs only at temperatures of below 50° C., to provide crystallization from a strong supersaturation of said solution.

2. Process according to claim 1, wherein, in cooling said hot nitroguanidine solution, the hot, nitroguanidine solution is poured into a cold diluent miscible with said solvent, but showing no solubility or a low solubility with respect to nitroguanidine, whereby a mixture of the solution and the diluent is formed, and the mixture cooled.

3. Process according to claim 1 or 2, characterized in that the nitroguanidine solution contains water or xylene in addition to said solvent.

4. Process according to claim 2, characterized in that the diluent consists of a lower aliphatic alcohol, acetone, carbon tetrachloride, chloroform, dioxane, tetrahydrofuran, benzene, or a mixture thereof.

5. Process according to claim 1, wherein the hot nitroguanidine solution is cooled in a coolant having a constant temperature of about 0° C.

6. Process according to claim 2, wherein the diluent has a temperature of about 0° C.

7. Process according to one of claims 2, 4 or 6, wherein the nitroguanidine solution diuent mixture is cooled in a coolant having a constant temperature of about 0° C.

8. Process according to one of claims 1, 2, 5 or 6, wherein the temperature gradient during cooling is about 7° C./minute.

9. Process according to claim 1, wherein the solution is cooled in the presence of nucleating agents.

10. Process according to claim 2, wherein the mixture is cooled in the presence of nucleating agents.

11. Process according to claim 9, wherein the nucleating agents are selected from the group consisting of insoluble additives fine-grained nitroguanidine and fine-grained explosives.

12. Process according to claim 11, wherein said nucleating agents are insoluble additives, and said insoluble additives are selected from the group consisting of $SiO_2$, $TiO_2$, CuO and PbO.

13. Process according to claim 10, wherein the nucleating agents are selected from the group consisting of insoluble additives, fine-grained nitroguanidine and fine-grained explosives.

14. Process according to claim 13, wherein said nucleating agents are insoluble additives, and said insoluble additives are selected from the group consisting of $SiO_2$, $TiO_2$, Cuo and PbO.

15. Process according to claim 1, wherein the crystallized nitroguanidine is separated out and the mother liquor, remaining after separation of the crystallized nitroguanidine, is recycled to be reused in the preparation of further nitroguanidine.

16. Process according to claim 1 or 2, wherein the polyhydric lower aliphatic alcohols contain 2–4 carbon atoms.

17. Process according to claim 1 or 2, wherein the solvent is selected from the group consisting of ethylene glycol; di-ethylene glycol; mono-methyl-, ethyl-, isopropyl, and butyl-ethers of ethylene glycol and di-ethylene glycol; propanediol; butanediol; and glycerin.

18. Process according to claim 17, wherein the solvent is selected from the group consisting of mono-methyl-, ethyl-, isopropyl-, and butyl-ethers or ethylene glycol and di-ethylene glycol; propanediol; and butanediol.

19. Process according to claim 1 or 2, wherein the solvent is dimethyl sulfoxide.

20. Process according to claim 2, wherein said solvent is diethylene glycol, and said diluent is tetrahydrofuran.

21. Process according to claim 2, wherein said solvent is diethylene glycol monomethyl ether, and said diluent is dioxane.

22. Process according to claim 1, wherein the solvent is selected from the group consisting of ethylene glycol and diethylene glycol monomethyl ether.

23. The product produced by the process of claim 1.

24. The product produced by the process of claim 2.

25. The product produced by the process of claim 12.

26. The product produced by the process of claim 14.

* * * * *